United States Patent
Ramaswamy et al.

(10) Patent No.: US 8,543,991 B2
(45) Date of Patent: Sep. 24, 2013

(54) PROFILE DRIVEN MULTICORE BACKGROUND COMPILATION

(75) Inventors: Subramanian Ramaswamy, Redmond, WA (US); David Hiniker-Roosa, Seattle, WA (US); Feng Yuan, Bellevue, WA (US); Sedar Gokbulut, Bellevue, WA (US); Ashok C. Kamath, Sammamish, WA (US); Jan Kotas, Redmond, WA (US); Vance P. Morrison, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 193 days.

(21) Appl. No.: 13/044,567

(22) Filed: Mar. 10, 2011

(65) Prior Publication Data

US 2012/0233602 A1 Sep. 13, 2012

(51) Int. Cl.
*G06F 9/45* (2006.01)

(52) U.S. Cl.
USPC ........... 717/148; 717/120; 717/127; 717/128; 717/130; 717/131; 717/146; 717/149; 717/150; 717/151; 717/153; 717/154; 717/155; 717/156; 717/157; 717/158

(58) Field of Classification Search
None
See application file for complete search history.

(56) References Cited

U.S. PATENT DOCUMENTS

| | | | |
|---|---|---|---|
| 6,507,946 B2 | 1/2003 | Alexander, III et al. | |
| 7,424,705 B2 * | 9/2008 | Lewis et al. | 717/148 |
| 7,765,527 B2 * | 7/2010 | Burka et al. | 717/130 |
| 2007/0226700 A1 * | 9/2007 | Gal et al. | 717/128 |
| 2007/0294681 A1 * | 12/2007 | Tuck et al. | 717/149 |
| 2009/0271775 A1 * | 10/2009 | Barsness et al. | 717/151 |
| 2010/0115501 A1 | 5/2010 | Partridge et al. | |

OTHER PUBLICATIONS

Krintz, Chandra J., et al. "Reducing the overhead of dynamic compilation." Software: Practice and Experience 31.8 (2001): 717-738.*
Krintz, et al., "Reducing the Overhead of Dynamic Compilation", Retrieved at << http://www.google.com/url?sa=t&source=web&cd=1&ved=0CBIQFjAA&url=http%3A%2F%2Fciteseerx.ist.psu.edu%2Fviewdoc%2Fdownload%3Fdoi%3D10.1.1.33.9276%26rep%3Drep1%26type%3Dps&ei=P6EZTY-DLZO7hAeUgoW3Dg&usg=AFQjCNG__orlq8ZYH8gQ5mOCxsGSbrWn8Nw >22 , Software: Practice and Experience, 2000, p. 1-19.
Vaswani, et al., "Dynamic recompilation and profile-guided optimisations for a .NET JIT compiler", Retrieved at << http://ieeexplore.ieee.org/stamp/stamp.jsp?tp=&arnumber=1249340&userType=inst >>, IEE Proc.-Softw., vol. 150, No. 5, Oct. 2003, p. 296-302.

(Continued)

*Primary Examiner* — Isaac Tecklu
*Assistant Examiner* — Adam Conkey (57) ABSTRACT

Idle processor cores can be used to compile methods that are likely to be executed by a program based on profile data that is captured during one or more previous executions. Methods that are determined by the profile data to be likely to be used can be compiled eagerly on one or more background threads. Transparency can be achieved by ensuring that module load order is not altered because of the background threads by recording the state of loaded modules after each profiled compilation, persisting that data, and waiting to eagerly compile a method until the method to be compiled and all its dependencies has been loaded by the executing program.

20 Claims, 5 Drawing Sheets (56) References Cited

OTHER PUBLICATIONS

Suganuma, et al., "A dynamic optimization framework for a Java just-in-time compiler", Retrieved at << http://citeseerx.ist.psu.edu/viewdoc/download;jsessionid=84B16385349D5A95F7F9CBA2645C157F?doi=10.1.1.86.2216&rep=rep1&type=pdf >>, Proceedings of the 16th ACM SIGPLAN conference on Object-oriented programming, systems, languages, and applications, Oct. 13-19, 2001, p. 150-194.

Suganuma, et al., "A Region-Based Compilation Technique for a Java Just-In-Time Compiler", Retrieved at << http://www.google.com/url?sa=t&source=web&cd=8&ved=0CEIQFjAH&url=http%3A%2F%2Fciteseerx.ist.psu.edu%2Fviewdoc%2Fdownload%3Fdoi%3D10.1.1.91.6657%26rep%3Drep1%26type%3Dpdf&ei=7qsaTYnTKsaYhQfm3KG3Dg&usg=AFQjCNGvYCg-LCFcDMUTO-s7LIBOfc50Ow >>, Conference on Programming Language Design and Implementation, Jun. 8-11, 2003, pp. 12.

Sirer, et al., "A Practical Approach for Improving Startup Latency in Java Applications", Retrieved at << http://www.cs.cornell.edu/People/egs/papers/kimera-wcsss99.pdf >>, Feb. 26, 1999, pp. 9.

Zhu, et al., "Improving Startup Performance for a Medical Image Viewing Application", Retrieved at << http://ieeexplore.ieee.org/stamp/stamp.jsp?arnumber=04476252 >>, IT Pro, IEEE Computer Sooiety, Mar./Apr. 2008, p. 38-45.

Suganuma, et al., "Design and Evaluation of Dynamic Optimizations for a Java Just-In-Time Compiler", Retrieved at << http://www.ittc.ku.edu/~niehaus/classes/750-s07/documents/suganuma-jit-long.pdf >>, ACM Transactions on Programming Languages and Systems, vol. 27, No. 4, Jul. 2005, pp. 732-785.

\* cited by examiner

PROFILE DRIVEN MULTICORE BACKGROUND COMPILATION

BACKGROUND

For an increasing number of modern programming languages and environments including but not limited to JAVA, Microsoft's .NET and scripting languages, just-in-time (JIT) compilation is becoming more common. Traditionally, computer programs were either statically compiled during development time or interpreted at run time. Interpreted computer programs are decoded and immediately executed. Statically compiled code is translated into machine code during development time to create an executable file which is then deployed and executed for multiple executions. A JIT compiler translates code during execution and caches the translated code for the lifetime of the process.

While JIT compilation can improve the runtime performance of computer programs in comparison to interpreted programs, JIT compilation can be associated with runtime overhead. JIT compilation can be responsible for a considerable part of start-up time because at start-up a large number of methods are often executed for the first time in the process. In a pure JIT compiled environment, the first time code is executed, it has to be JIT compiled; hence, there can be a time lag or latency between the point at which a user initiates a program that is JIT compiled and the point at which the program becomes responsive to the user. This lag time is called start-up latency. JIT compilation aims to attain the performance of static compilation, while retaining the benefits of interpretation. JIT compilation allows code that is portable to be deployed. JIT compilation enables environment-specific code generation including generating code that is specific to the target architecture and to security settings.

SUMMARY

Some of the JIT compilation traditionally performed in a foreground execution thread can be off-loaded to one or more background threads of a multi-processor computing machine. Instead of waiting to compile a method until it is used, methods that are likely to be used can be selected for pre-compilation on background threads as the program is executing.

Profile data can be collected automatically and transparently, without altering execution of the program. For example, methods that are executed in one execution of the program (e.g. a first execution) can be recorded and this information can be persisted to a data store (e.g., a non-transitory storage medium). The profile data can be automatically and transparently consumed while avoiding functionality or behavior changes such as but not limited to those that would be caused by executing a unit of program code, such as a method, on an unexpected thread, or attempting to compile a unit of program code, such as a method, before the method's dependencies are loaded. Profile data from previous executions can be transparently generated and consumed to predict methods that are likely to be executed in future executions of the program. For example, the next execution of the program (e.g., a second execution) can automatically retrieve the persisted profile information from a previous execution (e.g., the first execution) and can begin to compile the methods identified in the profile data without waiting for the method to be called by the second execution of the program. Meanwhile, the second execution of the program can transparently, without altering the execution of the program, record methods executed during the second execution of the program and can persist the methods executed in the second execution of the program to the first data store or to a separate (second) data store. The methods recorded in the second execution of the program can replace or add to the information persisted by the first execution of the program in the first data store. Various well-known or novel algorithms can be applied to the stored profile data to predict methods that are likely to be executed in future executions of the program and/or rank the likelihood of execution of the methods in future executions of the program.

Idle CPU cycles and available processor cores can be used to reduce the impact of JIT compilation costs on startup latency. Idle processor cores can be used to compile methods that are likely to be executed by the program. Likelihood of the methods to be compiled can be based on the profile data that was captured during one or more previous executions, or can be based on other algorithms. Methods that are determined likely to be used can be compiled eagerly on one or more background threads.

Transparency can be achieved by ensuring that module load order and module state are not altered because of the background threads. The state of loaded modules after each profiled compilation can be recorded and persisted. A method is not compiled in a background thread until the method to be compiled and all its dependencies have been loaded into the process by the executing program. Transparency can be achieved by ensuring that code execution is not performed on the background threads by emitting stubs to defer running of user code until the first access by the executing program.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

A program or application can be automatically profiled to identify program entities such as but not limited to methods that the software executes. The automatically-generated profile can be persisted to a storage medium. Profile data can include a sequential list of methods executed by an executing program and a list of modules that are loaded into the process at the time a particular method was executed by the process. Profile data can include a sequential list of methods executed by an executing program and a list of modules that are dependencies of a particular method that was executed by the process. The program code identified in the profile data can be JIT compiled at a subsequent program launch. The compilation can occur on one or more background threads using idle processor cores and may reduce JIT compilation impact on startup latency. Collection of profile data and compilation on background threads can occur without causing errors and with no alteration of execution sequence of modules. Start-up times and responsiveness of programs, applications and websites may improve using these techniques.

In accordance with aspects of the subject matter disclosed herein, the methods and other program entities that are compiled when a program is executed can be monitored. A sequential list of methods that were executed in an execution of the program can be persisted in a profile. Each program can have multiple profiles, based on different executions (e.g., executions may differ because the inputs to the program may be different). Additionally, each execution of a program can have multiple profiles, one for each program phase (a program can be thought of as a sequence of smaller programs called phases). The background threads can be managed to enable compilation tasks to be parceled out to the background threads in subsequent executions of the program. Profile information can be locked so that profile data deployed with a program cannot be changed. Profile information can be modifiable, permitting one or more executions of the program to add to, change and/or overwrite existing profile data.

The execution of programs can be monitored in a way that is stable in the face of the system's extra, out-of-order compilation in the background thread. That is, the methods that are compiled on background threads that would have been JIT compiled in a normal execution can be identified by separating the process of compilation from the process of publishing a compiled method. Methods are only published when they are used (i.e., executed) in the program by the foreground thread(s). Only the methods that are published are recorded by the recorder. This allows accurate data collection that is not affected by the speculative compilation on the background thread(s). If methods that were speculatively compiled but were not executed were added to the data store, the set of methods stored in the data store could grow unbounded and could persist inaccurate information. Recording only published methods ensures that only the methods that are being executed are queued up for background compilation in a subsequent execution.

In accordance with aspects of the subject matter disclosed herein, the module load order is not altered despite the use of the background threads for pre-compilation. Altering the module load order can cause the program to fail. For example, the compilation itself can fail because of missing dependencies, or, the module initialization code can run on an unexpected thread, which can cause the problems described below. Out-of-order module loading can be prevented by recording the state of loaded modules after each profiled compilation, persisting the recorded state data, and waiting to eagerly compile a method until all the modules needed by a method have already been loaded into the process by the foreground thread executing program. In systems in which modules are loaded in multiple stages, (e.g., a stage in which data is loaded into memory, a stage at which security checks are performed, a stage at which the module is active, etc.), elevation of a module to a new stage on the background thread is prevented.

In accordance with aspects of the subject matter disclosed herein, user code execution is not performed on background threads. Executing user code on a background thread can cause the program to fail for a wide variety of reasons, such as for example, when code that is written to use thread-local storage is executed. Executing code on background threads can be prevented by avoiding background module loads as described above and by emitting stubs to defer running of any other user code that the system typically runs during JIT compilation.

In accordance with aspects of the subject matter disclosed herein, some of JIT compilation costs can be mitigated by pre-compiling some methods on background threads and persisting the list of executed methods in a data store for use by subsequent executions of the program.

Profile Driven Multicore Background Compilation

Figure 1:
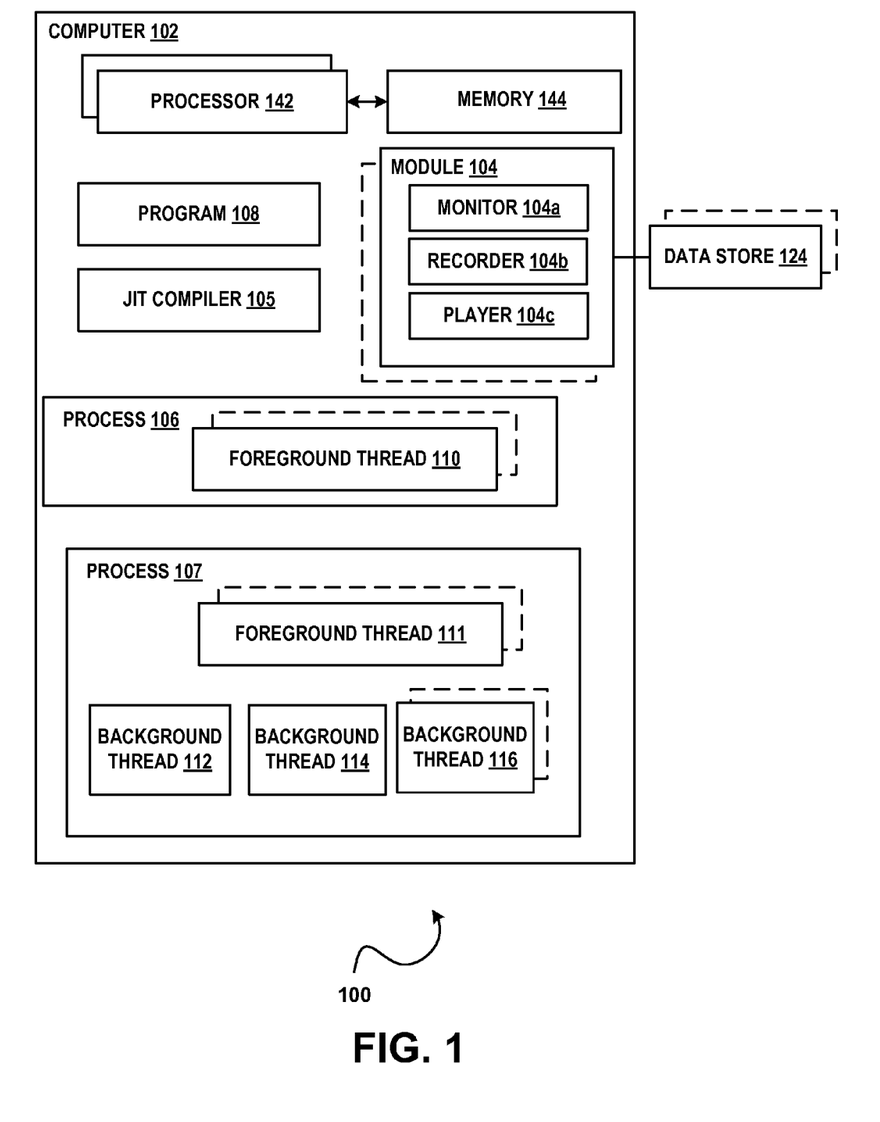
FIG. 1 illustrates an example of a profile-driven system 100 that compiles program code on background threads in accordance with aspects of the subject matter disclosed herein.

FIG. 1 illustrates an example of a system 100 for profile driven multicore background compilation in accordance with aspects of the subject matter disclosed herein. All or portions of system 100 may reside on one or more computers such as the computers described below with respect to FIG. 3. System 100 or portions thereof may be provided as a stand-alone system or as a plug-in or add-in. System 100 may execute on a software development computer such as the software development computer described with respect to FIG. 4. System 100 may execute within an IDE such as the IDE described with respect to FIG. 4. All or portions of system 100 may be implemented as a plug-in or add-on.

System 100 may include one or more of a multicore computer 102 comprising: one or more processors such as processor 142, etc. or one or more coprocessors (not shown), a memory such as memory 144, and one or more profile driven multicore background compilation modules such as module 104, etc. for profile driven multicore background compilation as described herein. System 100 may also include a JIT compiler 105. Other components well known in the arts may also be included but are not here shown. It will be appreciated that one or more profile driven multicore background compilation modules such as profile driven multicore background compilation module 104, etc. can be loaded into memory 144 to cause one or more processors such as processor 142 to perform the actions attributed to the one or more profile driven multicore background compilation modules.

One or more processes such as process 106, etc. may execute on system 100. For example, process 106 may be executing a program such as, for example, program 108. Program 108 may include one or more program modules. Process 106 may include one or more program threads such as foreground thread 110, etc. As used herein, foreground threads refer to those program threads that would exist in a system in which profile driven multicore background compilation as described herein is not enabled. Process 106 may also include one or more background threads (not shown). As used herein, background threads are threads created in a profile driven multicore background compilation-enabled system on which pre-compilation of methods, as described herein, can occur. A subsequent execution of program 108 is illustrated in FIG. 1 by process 107. It will be appreciated that although FIG. 1 shows execution of program 108 and on a single computer, the subject matter described herein is not so limited. For example, one execution of a program such as program 108 can occur on one computer (e.g., a software development computer) and a subsequent execution of the program can occur on another computer (e.g., a computer on which the program, the profile driven multicore background compilation module 104, etc. and the profile data is deployed), enabling even the first launch of a program on a particular computer to benefit from profile data. Moreover, the profile data can be locked, disallowing modification of the profile data deployed with the program, or alternatively, can be modifiable. Process 107 may include one or more foreground threads such as foreground thread 111, etc. and one or more background threads such as background thread 112, background thread 114, background thread 116, etc. Profile driven multicore background compilation module 104, etc. may represent a background compilation manager and may create one or more of the background threads including background thread 112, background thread 114, background thread 116, and so on. Alternatively, one or more of the background threads can be initiated by another module or modules.

Profile driven multicore background compilation module 104, etc. can include a monitor, monitoring module or submodule such as monitor 104a, a recorder, recording module or submodule such as recorder 104b and a player, player module or submodule such as player 104c. The monitor (e.g., monitor 104a) can monitor one, multiple or all of the foreground threads such as foreground thread 110, etc. The monitor can monitor the execution of a program such as program 108 and can collect information such as for example, what methods are being executed in a particular execution of program 108. The monitor can also monitor the state of loaded program modules after each profiled compilation. The monitor can pass the collected monitoring information to the recorder (e.g., recorder 104b). The monitor (e.g., monitor 104a) can also monitor subsequent executions of programs such as program 108. The monitor can monitor one, multiple or all of the foreground threads such as foreground thread 111, etc. The monitor can also monitor one, multiple or all of the background threads such as background thread 112, background thread 114, background thread 116, etc. and can collect information such as but not limited to: one or more methods executed by a program, one or more modules loaded into the process at a point in time as which a method is compiled and/or executed, one or more modules that are dependencies of a method that is compiled and/or executed by a program, how long JIT compilation of a particular method takes, and so on. The initial execution and subsequent executions of the program can execute on the same computer or on different computers.

The recorder may persist or store the information received from the monitor in one or more data stores such as data store 124, etc. Data store 124, etc. can be available to subsequent executions of program 108. The player (e.g., player 104c) can retrieve information stored by the recorder in the profile data store and parcel out and manage compilation of program entities identified in the profile data store in one or more background threads. The player can wait to eagerly compile a method until the program modules listed in the profile data for the method being compiled have been loaded by the executing program because if a method is chosen to be compiled in a background thread and the program modules that the method being compiled references have not been loaded, the compilation may lead to an application crash as described earlier.

The player may achieve transparency by ensuring that code execution is not performed on the background threads. When a background thread is initiated by the player for background compilation, logic is executed that prevents execution of user code on the background thread. The logic that is executed may include the use of stubs to defer running of user code until the first access by the executing program. In accordance with some aspects of the subject matter disclosed herein, the information passed to the recorder by the monitor and/or the information recorded by the recorder includes a sequential list of methods that are used by the foreground thread or threads and does not include methods that are compiled by the background threads but are never used by the foreground thread. In accordance with some aspects of the subject matter disclosed herein the information recorded by the recorder includes information about work performed by the foreground threads and does not include information about work performed in the background threads.

Figure 2A:
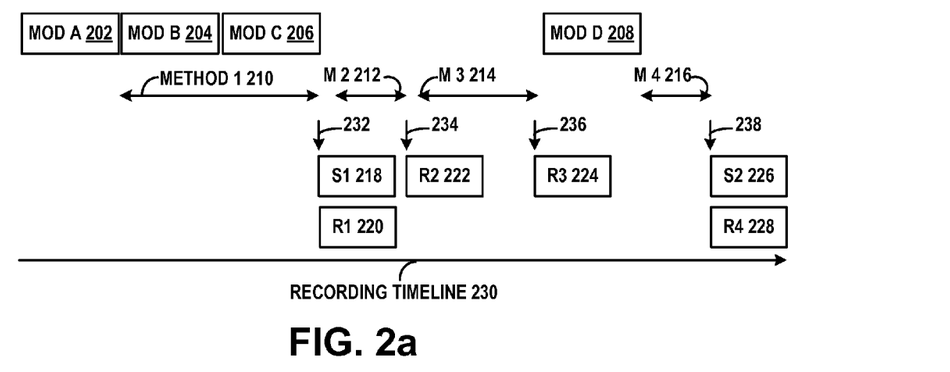
FIG. 2a is an illustration of an example of a recording timeline in accordance with aspects of the subject matter disclosed herein.

In accordance with some aspects of the subject matter disclosed herein, after a method has been compiled by the foreground thread, a snapshot can be taken. The snapshot can include a set of program modules comprising all of the program modules that were loaded in the process at compilation time. Alternatively, a snapshot can include a set of program modules that a method depends on. It will be appreciated that these sets may differ. For example, a snapshot of all loaded program modules may suggest that modules A, B and C are needed for Method 1 to compile, but a computing of dependencies may determine that Method 1 only needs program modules A and B to be loaded to compile. Whenever a method is compiled by the foreground thread, information can be added to the snapshot. For example, referring now to FIG. 2a, representing a recording timeline 230 of an execution of a program in a process (e.g., a first execution executing in a first foreground thread of a first process), suppose when Method 1 210 is compiled and executed, Module A 202, Module B 204 and Module C 206 have been loaded into the process by a foreground thread. After Method 1 210 has been compiled, at the point in the recording timeline indicated by arrow 232, a snapshot (e.g., Snapshot 1 218) can be taken that indicates that Module A 202, Module B 204 and Module C 206 were loaded in the process when compilation of Method 1 210 occurred.

At this point, recording data can be collected (e.g., Recording Data 1 220) that indicates that Method 1 210 was executed in the foreground thread. At the time indicated by arrow 234, Method 2 212 has been compiled and executed. No additional modules have been loaded into the process. The profile information is updated to record the execution of Method 2 212 in the foreground thread (e.g., Recording Data 2 222). At the time indicated by arrow 236, Method 3 214 has been compiled and executed. No additional modules have been loaded into the process. The profile information is updated to record the execution of Method 3 214 (e.g., Recording Data 3 224). Module D 208 is subsequently loaded into the process and Method 4 216 is compiled and executed. After Method 4 216 has been compiled, at the point in the recording timeline indicated by arrow 238, a snapshot (e.g., Snapshot 2 226) can be taken that indicates that Module D 208 has been loaded in the process. Hence, at this point, Module A 202, Module B 204, Module C 206 and Module D 208 were loaded into the process when compilation of Method 4 216 occurred. At this point, recording data (e.g., Recording Data 4 228) can be collected that indicates that Method 4 216 was executed in the foreground thread.

Because Method 1 210 did successfully compile, it can be assumed that the set of modules that includes Module A 202, Module B 204, Module C 206 includes all the modules needed by Method 1 210 (dependencies of Method 1 210). It will be appreciated that if the snapshot includes all the program modules loaded when Method 1 210 successfully compiled, the set of modules that includes Module A 202, Module B 204, Module C 206 may include one or more modules that are not actually needed by Method 1 210. For example, Method 1 210 may only actually need Module A 202 and Module B 204 but because Module C 206 was loaded at the time Method 1 210 compiled, Module C 206 is included in the profile data in the list of modules that Method 1 210 needs. When Method 4 216 is compiled, Module D 208 has been loaded. Hence Module D 208 is added to the profile data for the list of modules that have to be loaded into the process for Method 4 216 to compile. As described above, snapshot data can include all the modules loaded when the method compiled and/or computed dependencies for the method.

Figure 2B:
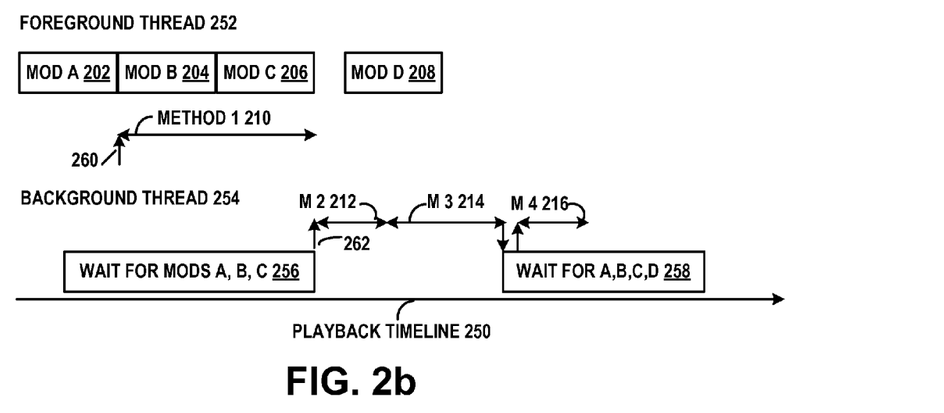
FIG. 2b is an illustration of an example of a playback timeline in accordance with aspects of the subject matter disclosed herein.

Given the information recorded in the recording timeline 230, FIG. 2b illustrates an example of a resulting playback timeline 250 for a subsequent execution of a program in a process (e.g., a second execution executing in a foreground thread of a second process). Suppose in an execution subsequent to the execution in which the profile information in recording timeline 230 was recorded, a foreground thread 252 loads Module A 202, then loads Module B 204 and then loads Module C 206. Method 1 210 may begin to be JIT compiled in the foreground thread 252 at the point in the timeline indicated by point A 260. Method 1 210 completes compilation in the foreground thread 252. Upon accessing the profile information stored from the previous execution, compilation work can be parceled out to one or more background threads. After Module A 202, Module B 204 and Module C 206 have been loaded into the process by the foreground thread 252, a background thread such as background thread 254 at the point in the timeline indicated by arrow 262, can begin to compile Method 2 212 and Method 3 214. Compiling of these methods waits (256) until Module A 202, Module B 204 and Module C 206 have been loaded into the process.

After Module D 208 has been loaded into the process by the foreground thread 252, Method 4 216 can be compiled in the background thread 254. Compilation of Method 4 216 waits (258) until Module A 202, Module B 204, Module C 206 and Module D 208 have been loaded into the process by the foreground thread 252 (or equivalently, the addition of Module D 208 to the set of already-loaded modules). It will be appreciated that although in the example provided, one background thread is shown, a plurality of background threads may be initiated. For example, as soon as Module D 208 is loaded into the process, a second thread can start to compile Method 4 216.

Figure 2C:
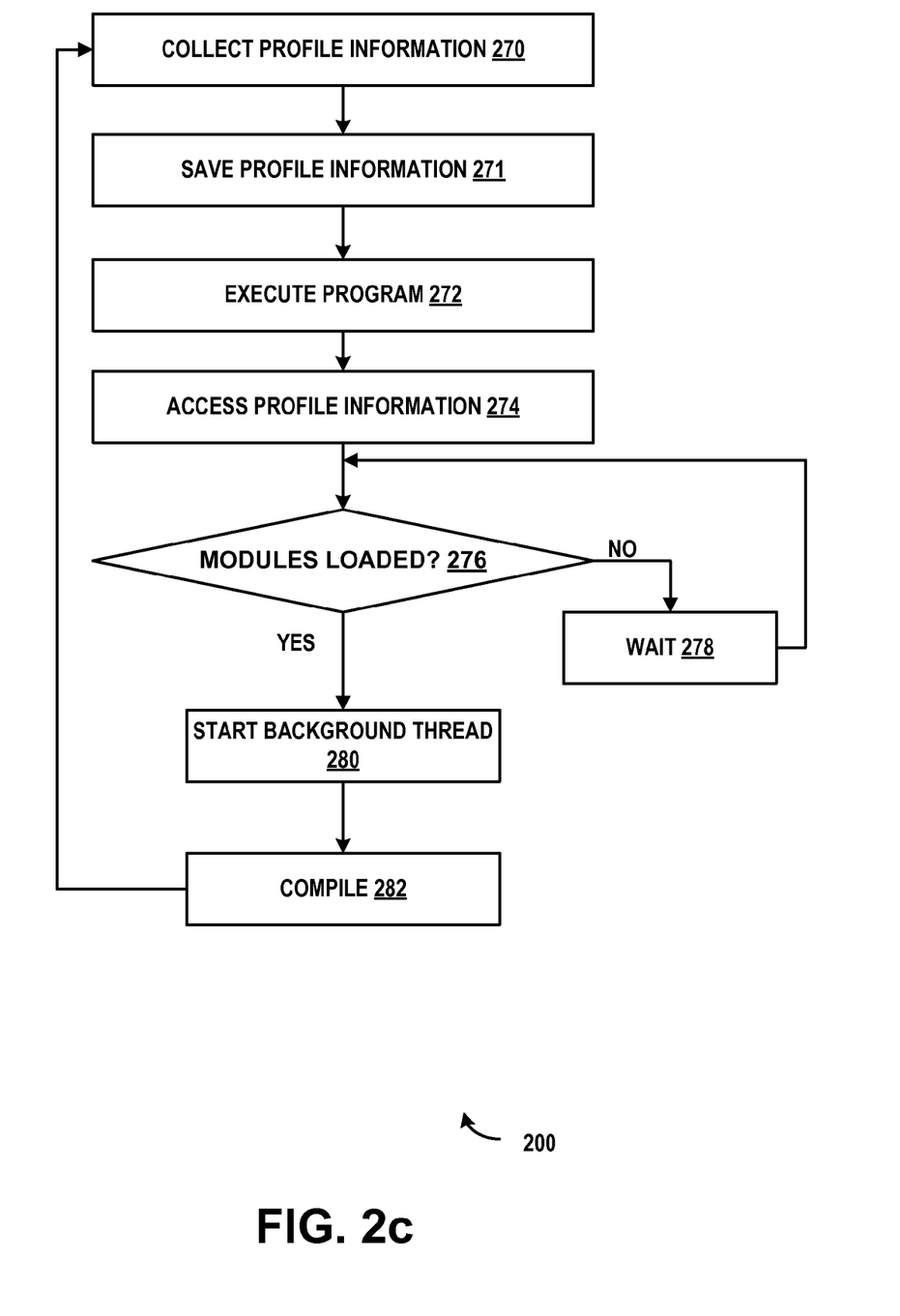
FIG. 2c is a flow diagram of an example of a method 200 that compiles program code on background threads in accordance with aspects of the subject matter disclosed herein.

FIG. 2c illustrates an example of a method 200 for background compilation in accordance with some aspects of the subject matter disclosed herein. The method described in FIG. 2c can be practiced by a system such as but not limited to the one described with respect to FIG. 1. Some of the actions described below can be optional. Some of the actions described below can be executed in a sequence that differs from that described below.

At 270 profile information for a program, application or website can be collected from an executing program, application or website. In addition to collection of profile data as described above, other methods of collecting profile data are contemplated including but not limited to parsing source code and determining dependencies from the parsed source code. Profile data can be collected by monitoring execution of the program as described above. At 271 profile data can be saved in a data store. At 272 the program can be executed in a foreground thread. The execution of the program can be monitored to collect additional profile information as described above. The execution of the program can also be monitored to track what modules have been loaded into the process by the foreground thread. At 274 profile information for the program can be accessed. The accessed profile information can include a set of modules that have to be loaded into the process before a particular method or methods can be compiled in a background thread. At 276 in response to determining that the set of modules listed for the method have not yet been loaded (278) a wait state is entered until the listed modules have been loaded into the process. At 280 in response to determining that the listed modules for the method have been loaded, a background thread at 282 can compile the method. This process can continue until the foreground thread is ended.

In accordance with aspects of the subject matter disclosed herein, in a scenario in which a plurality of methods can be compiled between module loads, various algorithms can be applied to determine a sequence of methods to be compiled in the background thread or threads. For example, in response to detecting that the foreground thread and the background thread are compiling the same method, referred to herein as a compilation contention, the background compilation manager can direct the background thread to skip ahead a specified number of methods instead of compiling the next sequential method. If another compilation contention is detected the number of methods to skip can be increased. Alternatively, instead of compiling in a forward sequence, the methods can be compiled in a backwards (reverse) sequence.

Example of a Suitable Computing Environment

Figure 3:
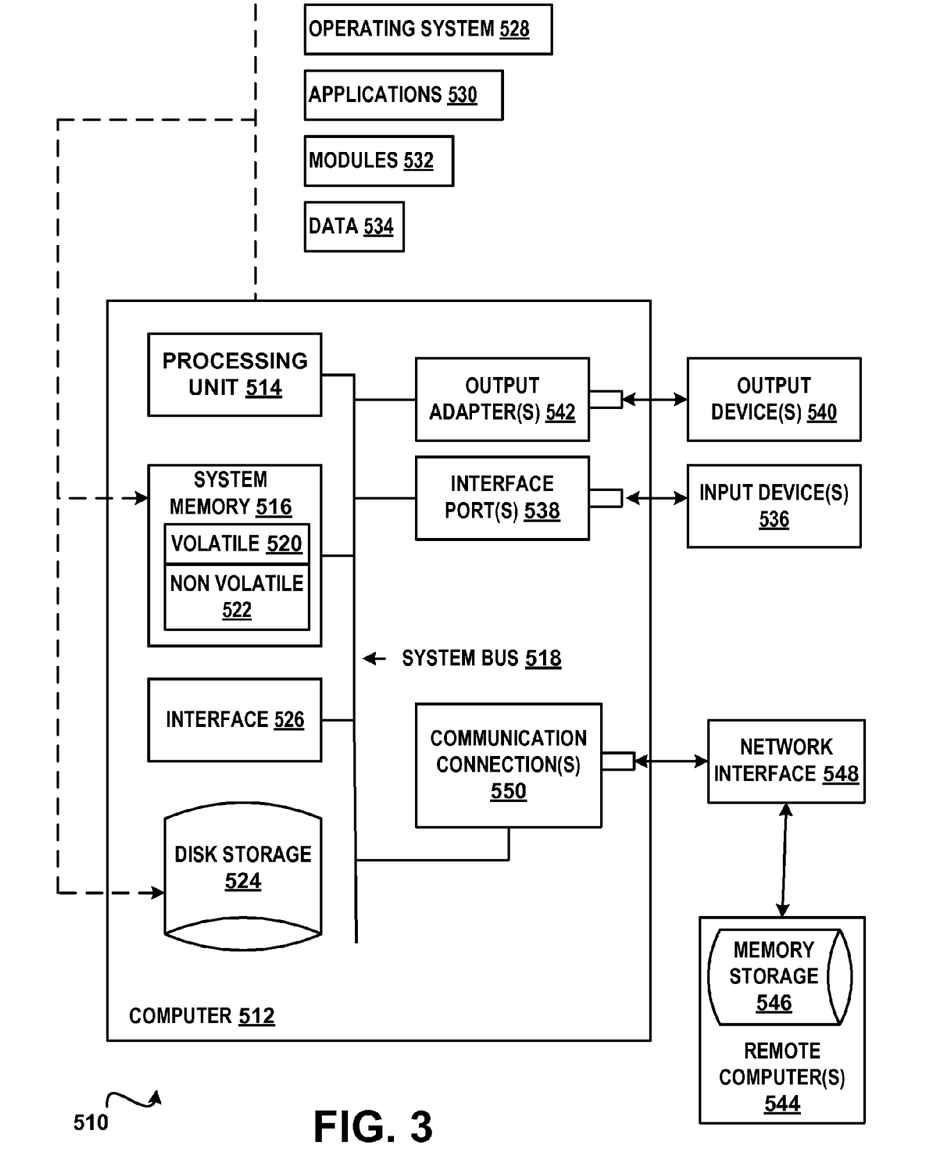
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other transitory or non-transitory medium which can be used to store the desired information and which can be accessed by computer 512.

It will be appreciated that FIG. 3 describes software that can act as an intermediary between users and computer resources. This software may include an operating system 528 which can be stored on disk storage 524, and which can allocate resources of the computer system 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538.

An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
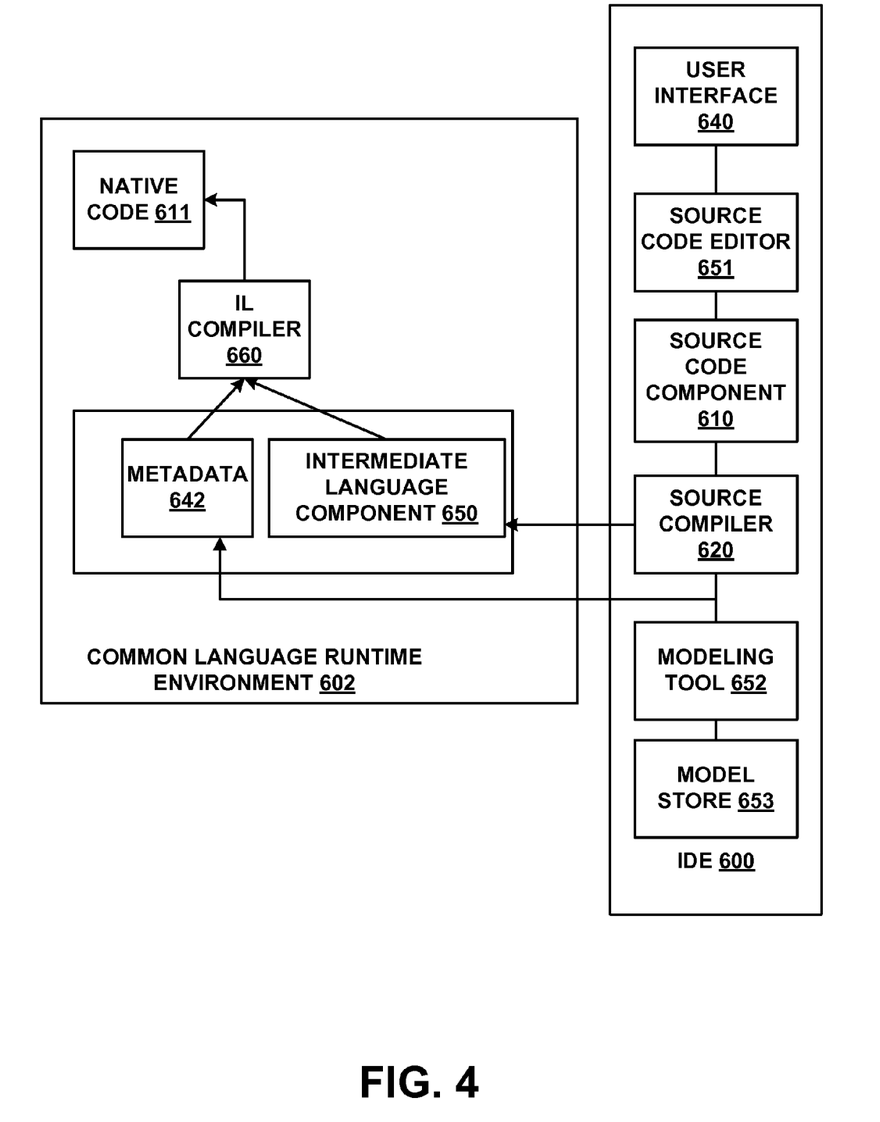
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
a processor and a memory of a multi-processor computing device; and
at least one module on the multi-processor computing device configured to cause at least one processor of the multi-processor computing device to:
collect profile information for a first execution of a program, without affecting the first execution by preventing execution of user code on background threads, the program executing in a foreground thread of a first process, the profile information for the first execution identifying at least one of a plurality of methods that the first execution of the program executes, and the profile information identifying a set of modules for the at least one method, the set of modules comprising dependencies of the at least one method;
monitor a second execution of the program in a foreground thread of a second process;
using the collected profile information, predict that the at least one method will likely be executed when the identified set of modules is loaded into the second process; and
in response to determining that the identified set of modules is loaded into the second process, compile the at least one method in a background thread of the second process using idle central processing unit cycles and an available processor core.

2. The system of claim 1, wherein the at least one module comprises a monitoring module that monitors execution of the program in the foreground thread of the second process without affecting the second execution of the program.

3. The system of claim 1, wherein the at least one module comprises a recording module that records profile information for the first execution of the program in a data store.

4. The system of claim 1, wherein the identified set of modules comprises a set of modules loaded into the first process at a point in time at which the at least one method of the plurality of methods was executed by the first foreground thread of the first process.

5. The system of claim 3, wherein profile information for the second execution is added to the profile information stored for the first execution in the data store.

6. The system of claim 1, wherein the at least one module comprises a player module that retrieves the profile information for the first execution and manages compilation of program entities identified in the profile information, wherein the compilation of program entities identified in the profile information is performed in at least one background thread of the second process.

7. The system of claim 1, wherein only published methods are recorded in profile information.

8. A method comprising:
monitoring by a processor of a multi-processor computing device a first execution of a program in a foreground thread of a first process;
transparently, without affecting the first execution by preventing execution of user code on background threads, collecting profile information for the first execution executing in the foreground thread of the first process, wherein the profile information for the first execution identifies a method executed by the foreground thread of the first process and a set of modules associated with the method executed by the foreground thread of the first process;
saving the collected profile information for the first execution in a data store;
monitoring a second execution of the program in a foreground thread of a second process executing on a processor of a multi-processor computing device;
transparently, without affecting the second execution by preventing execution of user code on background threads, collecting profile information for the second execution of the program executing in the foreground thread of the second process, wherein the profile information for the second execution identifies a method executed by the foreground thread of the second process and a set of modules associated with the method executed by the foreground thread of the second process;
initiating a background thread in the second process; and
compiling in the background thread the method identified in the data store in response to determining that the set of modules associated with the method saved in the data store are loaded in the second process.

9. The method of claim 8, wherein the associated set of modules comprises a set of modules loaded into the first process when the method is compiled in the first process or wherein the associated set of modules comprises computed dependencies of the method.

10. The method of claim 9, wherein in response to determining that the background thread is compiling the method identified in the profile information and the foreground thread of the second process is compiling the method, skipping a number of methods in a sequential list of methods in the profile information and compiling a next method.

11. The method of claim 10, wherein in response to determining that the background thread is compiling the next method and the foreground thread of the second process is compiling the next method, increasing the number of methods skipped in the sequential list of methods in the profile information and compiling a method following the skipped method in the list of sequential methods.

12. The method of claim 9, wherein in response to determining that the background thread is compiling the method identified in the profile information and the foreground thread of the second process is compiling the method, compiling a method in a list of sequential methods in the profile information in reverse sequence.

13. The method of claim 8, wherein profile information from the first execution of the program is stored in a first data store and wherein profile information from the second execution of the program is stored in a second data store.

14. The method of claim 8, wherein profile information is collected without altering execution of the program in foreground threads by recording state of loaded modules.

15. A computer-readable storage medium comprising computer-executable instructions which when executed cause at least one processor of a multi-processor computing device to:
access profile information collected for a previous execution of a program, the profile information identifying at least one of a plurality of methods executed by the previous execution of the program and wherein the profile information identifies a set of modules for the at least one method, the set of modules comprising a set of modules present when the at least one method was executed in the previous execution or the set of modules comprises a set of computed dependencies of the at least one method;

monitor a subsequent execution of the program in a foreground thread of a process; and in response to determining that the set of modules identified by the profile information is present in the process, initiate a background thread in the process, prevent user code from executing in the background thread; and compile the at least one method in the background thread of the process.

16. The computer-readable storage medium of claim 15, comprising further computer-executable instructions, which when executed cause the at least one processor to:

collect further profile information for the execution of the program; and store the further collected profile information in a data store.

17. The computer-readable storage medium of claim 15, comprising further computer-executable instructions, which when executed cause the at least one processor to:

monitor the background thread; and in response to determining that the background thread is compiling a particular method identified in the profile information and the foreground thread is compiling the particular method, skipping a number of methods in a sequential list of methods in the profile information and compiling a next method.

18. The computer-readable storage medium of claim 17, comprising further computer-executable instructions, which when executed cause the at least one processor to:

in response to determining that the background thread is compiling a second method identified in the profile information and the foreground thread is compiling the second method, increasing the number of methods skipped and compiling a next method in the sequential list.

19. The computer-readable storage medium of claim 15, comprising further computer-executable instructions, which when executed cause at least one processor to:

monitor the background thread; and in response to determining that the background thread is compiling a particular method identified in the profile information and the foreground thread is compiling the particular method, compiling methods in a sequential list of methods in the profile information in reverse sequence.

20. The computer-readable storage medium of claim 16, comprising further computer-executable instructions, which when executed cause at least one processor to:

store the further profile information in a second data store.

* * * * *